United States Patent
MacGillivray

(10) Patent No.: US 12,194,707 B2
(45) Date of Patent: Jan. 14, 2025

(54) STRUCTURE FORMATION APPARATUS, METHOD AND STRUCTURE

(71) Applicant: CORRIDOOR LIMITED, Southport (GB)

(72) Inventor: Patricia MacGillivray, Southport (GB)

(73) Assignee: CORRIDOOR LIMITED, Southport (GB)

( * ) Notice: Subject to any disclaimer, the term of this patent is extended or adjusted under 35 U.S.C. 154(b) by 0 days.

(21) Appl. No.: 18/035,718

(22) PCT Filed: Nov. 5, 2021

(86) PCT No.: PCT/GB2021/052885
§ 371 (c)(1),
(2) Date: May 5, 2023

(87) PCT Pub. No.: WO2022/096897
PCT Pub. Date: May 12, 2022

(65) Prior Publication Data
US 2023/0391040 A1 Dec. 7, 2023

(30) Foreign Application Priority Data
Nov. 6, 2020 (GB) .................................... 2017588

(51) Int. Cl.
*B31D 3/00* (2017.01)
*B31D 3/02* (2006.01)
(Continued)

(52) U.S. Cl.
CPC ........... *B31D 3/005* (2013.01); *B31D 3/0223* (2013.01); *B31D 5/006* (2013.01); *B31D 5/0065* (2013.01);
(Continued)

(58) Field of Classification Search
CPC ........ B31D 3/005; B31D 3/0223; B31D 3/12; B31D 3/0284; B31D 3/0295;
(Continued)

(56) References Cited

U.S. PATENT DOCUMENTS

| 1,389,294 A | 8/1921 | Dean |
| 2,933,122 A | 4/1960 | Christman |

(Continued)

FOREIGN PATENT DOCUMENTS

| DE | 19716637 A1 | 10/1998 |
| GB | 2436084 A | 9/2007 |

(Continued)

OTHER PUBLICATIONS

GB Patent Application No. 2203661.0, Intention to Grant dated Jul. 19, 2022, 2 pages.
(Continued)

*Primary Examiner* — Robert F Long
*Assistant Examiner* — Eduardo R Ferrero
(74) *Attorney, Agent, or Firm* — Cozen O'Connor

(57) ABSTRACT

According to the present disclosure there is provided a method of forming a first structure (150), comprising the steps of: providing one or more slots (124) in a material, thereby to define a plurality of strips (122) of the material, the slots (124) defining a series of connecting elements (128) connecting adjacent strips (122) of the material, the connecting elements (128) being spaced apart along a first direction (130), forming the material to provide: an array of oppositely oriented channels (152), each channel (152) extending in a second direction perpendicular to the first direction, and the array itself extending in the first direction, each channel comprising a base, and sides extending from the base; and a first, non-continuous, outer plane; and a second, non-continuous, outer plane, such that the first (Continued)

structure is foldable along each of the series of connecting elements about the first direction to bring the first outer plane of a first strip toward, and optionally into contact with, the first outer plane of a second, adjacent strip.

14 Claims, 6 Drawing Sheets

(51) Int. Cl.
*B31D 5/00* (2017.01)
*B32B 3/12* (2006.01)
*B32B 7/14* (2006.01)

(52) U.S. Cl.
CPC ................ *B32B 3/12* (2013.01); *B32B 7/14* (2013.01); *B31D 3/0284* (2013.01); *B31D 3/0292* (2013.01)

(58) Field of Classification Search
CPC ........ B31D 5/0065; B31D 3/02; B31D 5/006; B32B 7/14; B29D 24/00
See application file for complete search history.

(56) References Cited

U.S. PATENT DOCUMENTS

| | | | |
|---|---|---|---|
| 3,017,971 A | 1/1962 | Christman | |
| 3,082,142 A | 3/1963 | Payne et al. | |
| 3,404,748 A * | 10/1968 | Bjorksten | E04H 15/22 428/521 |
| 3,642,967 A * | 2/1972 | Doll | B29C 51/082 264/156 |
| 3,966,044 A * | 6/1976 | Cunningham | B65D 71/504 206/427 |
| 4,012,932 A * | 3/1977 | Gewiss | B31D 5/0082 72/190 |
| 4,022,481 A * | 5/1977 | Long | F16J 15/444 277/936 |
| 4,089,090 A * | 5/1978 | Westberg | B21D 31/04 29/6.1 |
| 5,088,170 A * | 2/1992 | Spath | B21D 31/046 29/6.1 |
| 5,095,597 A * | 3/1992 | Alhamad | B65D 81/02 29/6.1 |
| 5,389,059 A * | 2/1995 | Corwin | B65H 45/04 428/116 |
| 5,498,462 A * | 3/1996 | Darfler | B32B 3/12 428/116 |
| 5,538,778 A * | 7/1996 | Hurwitz | B65D 81/05 428/338 |
| 5,543,204 A | 8/1996 | Hemen | |
| 5,667,871 A * | 9/1997 | Goodrich | B31C 5/00 428/338 |
| 5,688,578 A * | 11/1997 | Goodrich | B65D 81/05 428/184 |
| 5,714,226 A * | 2/1998 | Disselbeck | B29C 51/002 428/116 |
| 5,894,044 A * | 4/1999 | Norcom | B31D 3/0246 428/116 |
| 6,419,867 B1 * | 7/2002 | Lang | B31D 5/0065 264/156 |
| 7,963,085 B2 * | 6/2011 | Sypeck | E04C 2/3405 52/654.1 |
| 8,668,855 B2 * | 3/2014 | Bradford | B31D 3/02 428/116 |
| 11,584,585 B2 * | 2/2023 | Goodrich | B65H 23/06 |
| 2002/0064629 A1 | 5/2002 | Yoshii | |
| 2004/0154252 A1 * | 8/2004 | Sypeck | B29C 24/00 52/506.01 |
| 2004/0219330 A1 * | 11/2004 | Bonebright | B32B 3/12 428/116 |
| 2008/0145602 A1 * | 6/2008 | Hendren | B29D 99/0089 428/116 |
| 2009/0081416 A1 * | 3/2009 | Goodrich | B31D 5/0086 428/34.3 |
| 2010/0078985 A1 * | 4/2010 | Mahoney | B32B 21/02 428/33 |
| 2011/0011521 A1 * | 1/2011 | Kolax | B32B 15/14 156/247 |
| 2011/0244177 A1 | 10/2011 | Naesstroem | |
| 2012/0205035 A1 | 8/2012 | Bradford | |
| 2015/0140265 A1 * | 5/2015 | Page | B31D 1/0075 493/379 |
| 2017/0203535 A1 * | 7/2017 | Oleske | B32B 5/022 |
| 2017/0282489 A1 * | 10/2017 | Greenfield | B32B 7/12 |
| 2018/0370702 A1 * | 12/2018 | Goodrich | B31D 5/0065 |
| 2019/0329512 A1 * | 10/2019 | Alter | B32B 5/024 |

FOREIGN PATENT DOCUMENTS

| | | |
|---|---|---|
| GB | 2601709 B | 9/2022 |
| JP | S56150534 A | 11/1981 |
| JP | H0740134 U | 7/1995 |
| JP | H07279307 U | 10/1995 |
| JP | 2002066672 A | 3/2002 |
| RU | 2710177 C1 | 12/2019 |
| WO | WO 1993023241 A1 | 11/1993 |

OTHER PUBLICATIONS

GB Patent Application No. 2017588.1, Combined Search and Examination Report dated Apr. 27, 2021, 7 pages.
PCT/GB2021/052885 International Search Report and Written Opinion dated Feb. 14, 2022, 15 pages.

* cited by examiner

STRUCTURE FORMATION APPARATUS, METHOD AND STRUCTURE

The present invention relates generally to a structure formation apparatus, to a method of forming a structure, a structure made using the apparatus or method or using any other apparatus or method, and a structure.

BACKGROUND

It is known to form structures from sheet material or comprising sheet-like portions. In one example, it is known to provide a structure that includes a profiled and/or formed structure (e.g. having a corrugation or undulation, such as a wave-like form). In another example, it is known to provide a structure that includes an array of honeycomb cells, formed by affixing planar strips of material at specific locations and subsequently separating the strips to form the cells.

In the art it is advantageous to use a variety of crush and compression tests to quantify the strength of such structures. One commonly used test is known as the "flat crush test". The test is, essentially, a measure of the load bearing capability of the structure to loads acting perpendicular to a surface of the structure or board.

Whilst corrugated cardboard has a high strength to weight ratio, certain structural defects often lead to poor flat crush test performance. For example, leaning, crushed, or poorly formed corrugations, all of which are commonly found in corrugated cardboard. In this case, applying a load perpendicular to the surface involves the application of force on to the already weakened corrugations.

Some honeycomb board is superior to corrugated cardboard under flat crush test. However, honeycomb board requires a capping layer to be provided over both the upper and lower surface of the honeycomb cell structures in order for it to exhibit any structural rigidity and to retain its shape. Honeycomb board is further limited in that the minimum board thickness is limited by the minimum height of cell wall strip that the manufacturing apparatus can manipulate. This may typically limit honeycomb board to at or above 10 mm thicknesses.

Moreover, whilst honeycomb board may exhibit enhanced strength properties, the maximum line speed (that is, the length of board that can be manufactured per unit time) is substantially slower than that of corrugated cardboard.

Additionally, whilst both corrugated and honeycomb structures may exhibit enhanced ability to withstand a force applied in one particular direction, under the application of a force in another direction they may be no stronger than the sheet from which they are formed.

Commercially available corrugated cardboard is material intensive as the size of the corrugations must be small to provide cushioning. Honeycomb is also material intensive as it requires capping layers in addition to the cell-forming strips. Other known structures are unnecessarily heavy as a forming process requires sheets to be folded directly back on one another along continuous faces, meaning that at certain points in the structure, layers of sheet are "doubled up". Also, existing approaches do not strike a balance between manufacturing cost, efficiency and complexity, versus the performance of the structure that is manufactured.

It is an object of the present invention to provide an improved structure, structure formation apparatus and method and/or to address one or more of the problems discussed above, or discussed elsewhere, or to at least provide an alternative structure, structure formation apparatus and method.

SUMMARY

According to the present invention there is provided an apparatus and method as set forth in the appended claims. Other features of the invention will be apparent from the dependent claims, and the description which follows.

According to a first aspect of the present invention there is provided a method of forming a first structure, comprising the steps of: providing one or more slots in a material, thereby to define a plurality of strips of the material, the slots defining a series of connecting elements connecting adjacent strips of the material, the connecting elements being spaced apart along a first direction; and forming the material to provide: an array of oppositely oriented channels, each channel extending in a second direction perpendicular to the first direction, and the array itself extending in the first direction, each channel comprising a base, and sides extending from the base; and a first, non-continuous, outer plane; and a second, non-continuous, outer plane, such that the first structure is foldable along each of the series of connecting elements about the first direction to bring the first outer plane of a first strip toward, and optionally into contact with, the first outer plane of a second, adjacent strip.

In other words, and in one example, the present disclosure teaches a method in which a material is scored, cut or otherwise formed to provide slots in the material. The one or more slots define a plurality of strips of the material. That is, the one or more slots may be one or more elongate slots defining elongate strips of material. In one example, the slots define two or more strips of material, the strips being separated by the slots. Such a step provides a series of connecting elements being defined by the slots. That is, terminal ends of the slots, beyond which the material is not cut through and remains intact, define connecting elements between adjacent strips. Such connecting elements may be referred to as "stems", as they stem between adjacent strips to provide a connection therebetween. Alternatively, connecting elements may be referred to as "connecting members". In one example, the connecting elements being spaced apart along a first direction defines a first axis.

The present disclosure further provides a method in which the material is formed to provide channels and planes. In one example, this step is performable prior to the scoring, cutting or forming to provide the aforementioned slots. In another, preferred, example, this step is performable after the scoring, cutting or forming to provide slots. Whilst the order in which providing slots and providing channels and planes is performed may seem trivial, the skilled person will appreciate from the present disclosure that vast improvements in throughput speeds may be achieved by providing slots prior to providing the channels. In this way, the resultant first structure can be provided efficiently and effectively. For example, providing the channels may be performed by a corrugator machine, examples of which are known in the art for manufacturing corrugated board. However, it is not known in the art to provide slots and connecting elements prior to corrugating the material. Doing so is highly advantageous, and yet perhaps counterintuitive, for the reasons set out herein and as will be recognised by the skilled person from a reading of this disclosure.

In one example, forming the material to provide an array of oppositely oriented channels comprises profiling the material. The profiling may be performed by a former assembly. The profile formed may be described as undulating, corrugated, or a wave-like profile. In one advantageous example, the profile formed is a trapezoidal profile. In this way, a second structure subsequently formed from the first structure, as discussed below, has a hexagonal cell structure.

The present disclosure further provides a method by which a first structure is provided which is foldable to bring corresponding planes of the first structure together. Thus, when the first structure is folded to bring said planes together, a second structure is formed, wherein the planes cooperate to provide support to one another. A lightweight yet robust second structure is thereby formed. The planes are not continuously extending flat sheets or surfaces, but can be thought of as mathematical or virtual planes at which, for instance, peaks or troughs, or tops and bottoms, of the first structure start or terminate.

By the present disclosure, and in one example, a first structure can thereby be provided which is formed, configured and/or arranged, to be manipulated or formed, to provide a second structure with highly advantageous structural properties and at high throughput speeds.

Such a method is advantageous for numerous reasons. The slots defining the strips is advantageous as the height of a subsequent second structure formed from the first structure is controllable by the width of the strips. The slots defining connecting elements allows the adjacent strips to remain connected. In this way, a second structure is providable with a shallow, or low, height, which as a result of the strips being connected, reduces the complexity of manipulation to provide the second structure. In contrast with honeycomb board structure, which cannot be made at low heights due to complexities in manipulating separated material strips, the present method is highly advantageous. The invention might be viewed as taking the benefits of corrugation (speed) and honeycomb (strength), but without the drawbacks.

Furthermore, providing the slots and forming the material to provide channels and planes as defined above produces a "blank" for manufacture of a second structure having highly advantageous properties. This blank is advantageous in its own right, as an advantageous input or feed structure for efficient formation of the second structure discussed below.

By forming the first structure to have a first, non-continuous, outer plane and a second, non-continuous, outer plane, weight saving benefits are realised, and manufacturing efficiency is improved, as the first structure need not be provided with a retaining, or capping layer.

In one example, the method comprises providing a plurality of successive slots in the material. In one example, the slots may be equally spaced. In one example, the method comprises providing a series of slots in a material. In one example, a series of slots is a series of two or more slots. The series of slots may be aligned in a first direction. In one example, the slots are spaced apart along a first direction. In one example, the spacing between successive slots in each series of slots define a series of connecting elements connecting adjacent strips.

In one example, the slots extend through, for example vertically down through, the first material. That is, the slots may extend through both the first outer plane and the second outer plane. In this way, weight saving benefits are realised by removal of material.

In one example, the material is formed to provide each series of connecting elements intersecting one of the first outer plane and second outer plane. That is, the connecting element may connect adjacent strips at the one of the first outer plane and second outer plane. In this way, folding is facilitated.

In one example, the step of providing the one or more slots in the material precedes the step of forming the material. In this way, high throughput speeds are realised, as well as a simplification of the manufacturing process.

According to a second aspect of the present invention there is provided a method of forming a second structure from a first structure, the first structure comprising: a plurality of strips of material, a length of each strip extending in a first direction, wherein adjacent strips are connected by a series of connecting elements, the connecting elements being spaced apart along the first direction, the material being formed to provide: an array of oppositely oriented channels, each channel extending in a second direction perpendicular to the first direction, and the array itself extending in the first direction, each channel comprising a base, and sides extending from the base; and a first, non-continuous, outer plane; and a second, non-continuous, outer plane, and folding the first structure along each of the series of connecting elements about the first direction to bring the first outer plane of a first strip toward, and optionally into contact with, the first outer plane of a second strip, the second strip adjacent the first strip.

The second aspect of the present invention may incorporate any or all of the features of the first aspect of the present invention, as desired or as appropriate.

In one example, folding the first structure involves folding a plurality of strips of the structure. For the avoidance of doubt, in a preferred example, it is not the strip itself which is folded, but the strip is rotated about the connecting elements to fold the strip in the manner described. In one example, folding to bring the planes into contact may mean guiding some or all of the channels of the strip substantially into contact. That is, the first structure may be folded to guide the strips to locate the planes contiguously. For instance, peaks or troughs of the strips are brought into contact one another.

In one example, the sides of a pair of adjacent strips are connected by a series of connecting elements. That is, the long edges of a pair of adjacent, and parallel strips, are connected by connecting elements. In one example, the spacing between successive connecting elements of a series defines a series of slots.

In one example, the method further comprises: folding the first structure to bring the second outer plane of the second strip toward, and optionally into contact with, the second outer plane of a third strip, the third strip adjacent the second strip. That is, the folding of the first structure is repeatable to build up a second structure of folded strips of a first structure. Advantageously, the contacting planes of the strips provide support to one another. A robust second structure is thereby formed. Of course, more than three strips may be utilised.

According to a third aspect of the present invention there is provided a first structure formation apparatus comprising: a cutter assembly arranged to provide one or more slots in a material, thereby to define a plurality of strips of the material, the slots defining a series of connecting elements connecting adjacent strips of the material, the connecting elements being spaced apart along a first direction; and a former assembly arranged to form the material to provide: an array of oppositely oriented channels, each channel extending in a second direction perpendicular to the first direction, and the array itself extending in the first direction, each channel comprising a base, and sides extending from the base; and a first, non-continuous, outer plane; and a second, non-continuous, outer plane, such that the first structure is foldable along each of the series of connecting elements about the first direction to bring the first outer plane of a first strip toward, and optionally into contact with, the first outer plane of a second, adjacent strip.

The third aspect of the present invention may incorporate any or all of the features of the first and second aspects of the present invention, as desired or as appropriate.

In a similar manner to above, the first structure formation apparatus is advantageous as it facilitates the provision of a first structure for manufacture of a second structure having advantageous structural properties. Providing a first structure having the aforementioned features facilitates folding as described throughout the present disclosure. Folding in the manner described is highly advantageous as it facilitates formation of a lightweight and robust second structure.

In one example, the cutter assembly is arranged to provide a series of slots in a material. A series of slots may comprise two or more slots. The series of slots may be spaced apart along the first direction. In one example, the spacing between successive slots in each series of slots defines a series of connecting elements connecting adjacent strips of the material.

In one example, the former assembly is arranged to form the material to provide each series of connecting elements intersecting one of the first outer plane and second outer plane. That is, the connecting element may connect adjacent strips at the one of the first outer plane and second outer plane. In this way, folding is facilitated.

The former assembly may be described as a "profiler" or "profiler assembly", because it is configured to profile the material. In one example, the former assembly is configured to form the material to provide a "wave profile". The wave profile may comprise corrugations, or undulations. In one highly advantageous example, the former assembly is configured to form the material to provide a trapezoidal shape profile. In this way, folding the first structure in the manner described provides a hexagonal cell structure (e.g. honeycomb or honeycomb-like). In one example, the former assembly is a corrugator assembly arranged to corrugate the material. Corrugating the material may involve forming to provide any channel profile, including a sinusoidal wave profile, or a trapezoidal profile. A corrugator assembly is highly advantageous as corrugations can be formed at high throughput speeds.

In one example, the cutter assembly is arranged to provide the one or more slots in the material prior to the former assembly forming the material. In this way, manufacture is simplified, as the slots can be provided to sheet material. In this way, the profiled form of the material need not be accommodated for during the provision of the slots. The material may then be subsequently formed to provide the slots and/or connecting elements in appropriate locations. That is, the material can then be subsequently formed to provide connecting elements intersecting the first outer plane, or second outer plane, such that folding is facilitated.

In one example, the cutter assembly is arranged to provide the one or more slots in the material subsequent to the former assembly forming the material. In one example, the cutter assembly is arranged to score (or "slit-score") the formed material to provide the one or more slots in the formed material. In one example, the cutter assembly is arranged to score the formed material from above and below the formed material to provide the slots and/or connecting elements. In this way, a preformed material may be processed to provide a first structure having connecting elements intersecting the first outer plane, or second outer plane, such that folding is facilitated.

In one example, the former assembly is arranged to form the material to provide: a first series of connecting elements intersecting the first outer plane, the first series of connecting elements connecting a first strip and a second strip, and a second series of connecting elements intersecting the second outer plane, the second series of connecting elements connecting the second strip and a third strip. That is, by appropriate forming of the material, and as a result, appropriate positioning of the channels, the connecting elements can be located as described. By doing so, a first structure is providable having advantageous structural properties, in that it is foldable to provide a second structure.

According to a fourth aspect of the present invention there is provided a second structure formation apparatus arranged to receive a first structure, first structure comprising: a plurality of strips of material, a length of each strip extending in a first direction, wherein the sides of a pair of adjacent strips are connected by a series of connecting elements, the connecting elements being spaced apart along the first direction, the spacing between successive connecting elements of a series defining a series of slots, the material being formed to provide: an array of oppositely oriented channels, each channel extending in a second direction perpendicular to the first direction, and the array itself extending in the first direction, each channel comprising a base, and sides extending from the base; and a first, non-continuous, outer plane; and a second, non-continuous, outer plane, the second structure formation apparatus comprising: a folder assembly arranged to fold the first structure about the first direction along each of the series of connecting elements, wherein the folder assembly is arranged to bring the first outer plane of a first strip toward, and optionally into contact with, the first outer plane of a second, adjacent strip.

The fourth aspect of the present invention may incorporate any or all of the features of the first, second and third aspects of the present invention, as desired or as appropriate.

In this way, a second structure can be formed by the second structure formation apparatus. Folding the first structure in such a manner is advantageous for the many reasons introduced above and described below.

In one example, the second structure formation apparatus comprises a manipulator assembly. In one example, the manipulator is arranged to manipulate the second structure to adjust or control the size of cells defined by the oppositely oriented channels of adjacent strips. In one example, the manipulator assembly is controllable to force the second structure inwardly to cause the cells to become narrower and elongated. In one example, the manipulator assembly comprises funneling guides and/or gripping members for this purpose. In one example, the manipulator assembly is controllable to stretch the second structure outwardly to cause the cells to become wider and shorter. The manipulator assembly may comprise funneling guides and/or gripping members for this purpose. In this way, the length and/or width of the total second structure may be controlled, by virtue of controlling the cell size.

In one example, the second structure formation apparatus further comprises a retainer applicator, arranged to apply a retainer to the second structure to fix the first strip and second strip in position relative to one another, optionally: applying the retainer in between the outer planes of the first and second strips; and/or applying the retainer across channels of the first and second strips.

Advantageously, by applying the retainer in between the planes, a cover sheet or capping layer need not be provided. Thus, a weight saving benefit can be realised. However, by applying the retainer across channels of the strips, for example by application of a cover sheet or capping layer, a robust, yet still lightweight, second structure is providable. A retainer applied in this way is also advantageous in improving flat-crush test performance, as force is distributed across the capping layer and to the second structure below.

According to a fifth aspect of the present invention there is provided a structure formed using the apparatus and/or method of any preceding claim.

The fifth aspect of the present invention may incorporate any or all of the features of the first, second, third and fourth aspects of the present invention, as desired or as appropriate.

According to a sixth aspect of the present invention there is provided a first structure comprising: a plurality of strips of material, a length of each strip extending in a first direction, wherein adjacent strips are connected by a series of connecting elements, the connecting elements being spaced apart along the first direction, the material being formed to provide: an array of oppositely oriented channels, each channel extending in a second direction perpendicular to the first direction, and the array itself extending in the first direction, each channel comprising a base, and sides extending from the base; and a first, non-continuous, outer plane; and a second, non-continuous, outer plane, such that the first structure is foldable along each of the series of connecting elements about the first direction to bring the first outer plane of a first strip toward, and optionally into contact with, the first outer plane of a second, adjacent strip.

The sixth aspect of the present invention may incorporate any or all of the features of any previous aspect of the present invention, as desired or as appropriate.

The first structure itself is advantageous in facilitating, and being useable in a process for, manufacture of a second structure.

In one example, the sides of a pair of adjacent strips are connected by the series of connecting elements. In one example, the spacing between successive connecting elements of a series define a series of slots. Connecting elements ensure strips are connected, which increases the speed at which the second structure can be formed by the second structure formation apparatus, as it simplifies manufacture. Strips therefore need not be manipulated individually, which can be difficult to control where strip widths are small.

According to a seventh aspect of the present invention, there is provided a second structure formed from a first structure according to the sixth aspect of the present invention, the second structure comprising: the first structure folded along each of the series of connecting elements about the first direction to bring the first outer plane of a first strip toward, and optionally into contact with, the first outer plane of a second, adjacent strip.

The seventh aspect of the present invention may incorporate any or all of the features of any previous aspect of the present invention, as desired or as appropriate.

Advantageously, the second structure performs well under flat crush test as a result of the array extending in the second direction and the channels in the first direction. Nevertheless, the second structure formation apparatus forms second structure in a simple and cost-effective manner. In one example, the contact of the outer planes of the first structure in the second structure provides a so called "beam strength". That is, the bases of the channels abut one another, and the abutment is aligned along an axis. The strips thereby provide mutual support, yet the second structure remains lightweight. Locating the planes contiguously is beneficial as material in the plane of the first strip provides support to material in the plane of the second strip. Under flat crush test, the planes may bear against one another, improving resistance of the second structure to applied load.

This is in contrast to proposed structures which comprise folded strips which have continuous first and second outer planes. Such structures are heavier than the present structure, yet do not exhibit vastly improved structural rigidity. The outer planes of each strip being non-continuous may mean that gaps are present in the plane, which may be gaps between channels as may be the case where a wave-like profile is used. In one example, one or both of the outer planes may be continuous. The first structure may then be subsequently cut as described to form the slots and folded to provide a second structure.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

Figure 1:
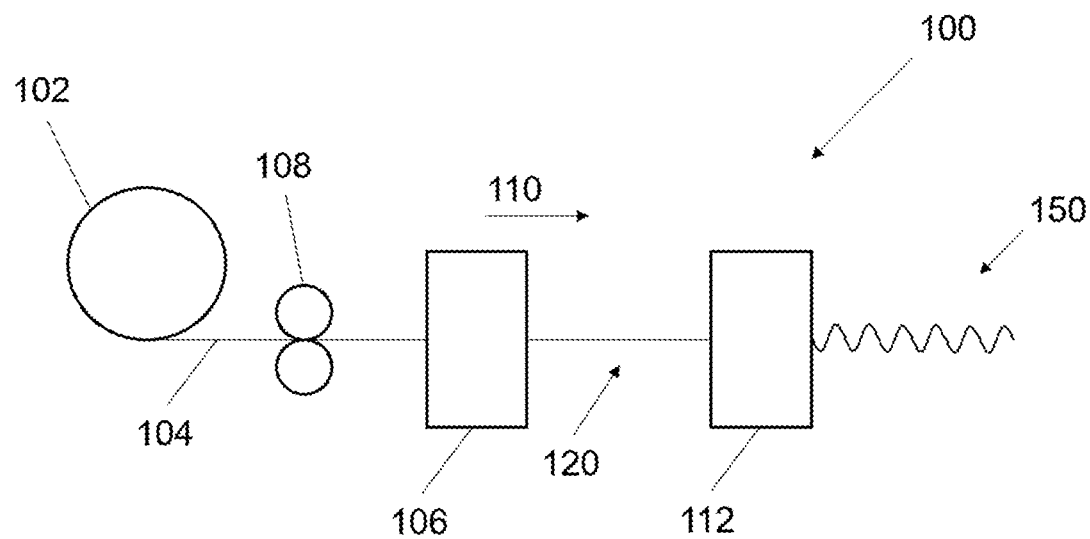
FIG. 1 shows a side view of a first structure formation apparatus.
Figure 2:
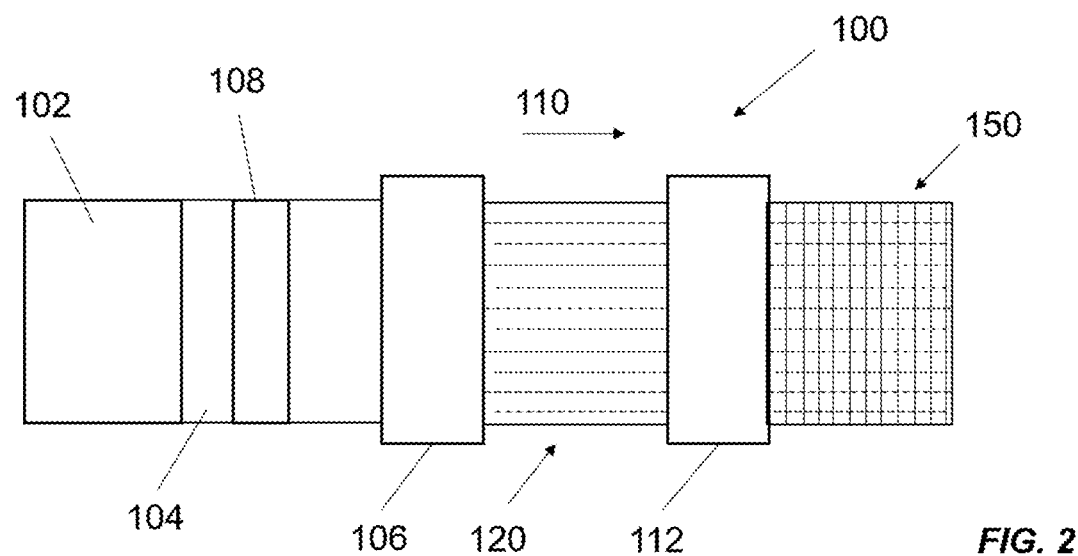
FIG. 2 shows a plan view of the first structure formation apparatus of FIG. 1.

Turning now to FIGS. 1 and 2, a first structure formation apparatus 100 is shown in side and plan view respectively. The first structure formation apparatus 100 comprises a sheet feeder 102 in the form of reels of sheet material. The sheet feeder 102 supplies sheet 104 in a continuous manner to a cutter assembly 106 via one or more driving, or roller, arrangements 108. The driving arrangements 108 may be used to control the flow path and speed of the sheet 104 through the apparatus 100.

The sheet 104 is typically kraft paper sheet. However, whilst kraft paper is particularly advantageous in being lightweight, recyclable and robust when appropriately formed, the skilled person will appreciate that any material suitable to be cut and formed in the manner described may be used. The person skilled in the art will appreciate that manufacturing processes other than those described herein may be suitable to manufacture the described first and/or second structures. For example, injection moulding techniques may be used to manufacture the first and/or second structures, which may facilitate the use of plastics or other materials from which the first and/or second structures may be formed. Furthermore, it will be appreciated by the person skilled in the art that first structures other than those described could be used in conjunction with the following disclosure in order to manufacture a second structure that would fall within the scope of the invention.

Returning to FIGS. 1 and 2, the driving arrangements 108 drive movement of the material through the apparatus 100 in a first (material movement, or flow) direction 110.

The cutter assembly 106 is arranged to cut the material to provide slots therein. The cutter assembly 106 is arranged to cut the material in a direction parallel to the first direction 110. The cutter assembly 106 comprises a platform for supporting the sheet material 104 as it passes through the cutter assembly 106.

A set of cutting blades (not shown) are supported on a support rail. In this exemplary embodiment, the cutter assembly 106 comprises a single set of cutting blades, either above or below the platform. Such an arrangement is particularly suited where the cutter assembly 106 is arranged to receive, and providing slots in, sheet material. The support rail on which the cutting blades are mounted is drivable using actuators. A controller connected to the actuators is programmed to drive the actuators and thereby move the support rail. Thus, the support rail is moveable to bring the cutting blades into contact with the sheet material as it passes through the cutter assembly. In this way, slots can be provided, by cutting the sheet material 104, and the controller can selectively drive the support rail to control the position of the slots provided in the sheet material 104.

The cutter assembly 106 is arranged to cut the sheet material 104 to provide a cut sheet, indicated at 120. The sheet may be referred to as a "blank", from which the first structure is formed.

Figure 3A:
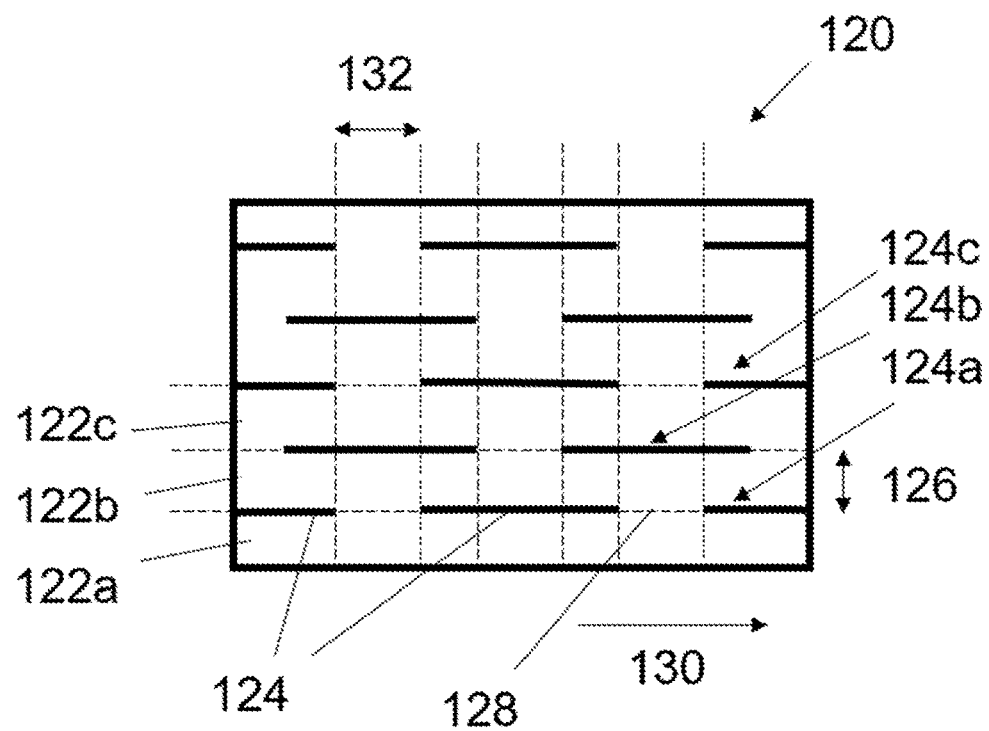
FIGS. 3(a) and (b) show plan views of a sheet comprising strips, slots and connecting elements.
Figure 3B:
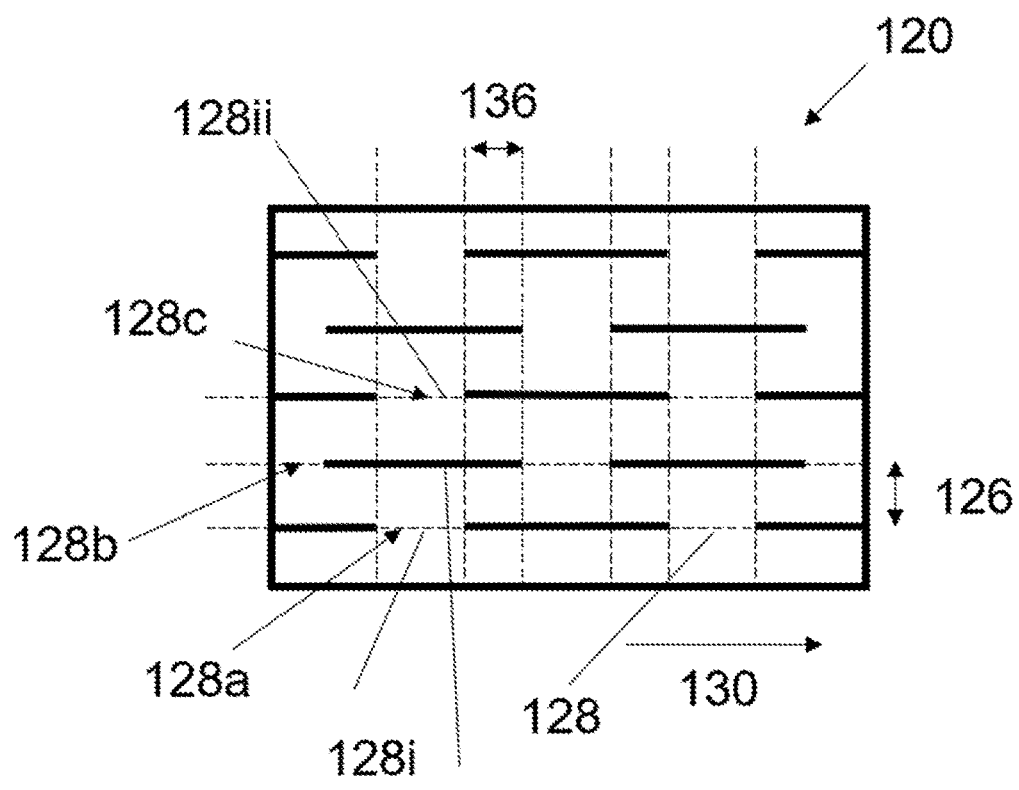

FIGS. 3(a) and 3(b) show two identical cut sheets. As shown in FIG. 3(a), the cut sheet 120 comprises a plurality of strips 122a, 122b, 122c of material, a length of each strip 122a-122c extending in a first direction 130. The strips 122a-122c are defined by the slots 124 provided in the material by the cutter assembly 106. That is, the slots 124 define the strip width 126. The slots 124 are provided as a plurality of series of slots 124a, 124b, each series of slots extending in the first direction 130. Each of the plurality of series of slots 124a-124c is parallel.

Between successive slots of a series, a connecting element 128 is defined as an uncut region of material. That is, adjacent strips 122a, 122b are connected by a series of connecting elements 128a, 128b, 128c, the connecting elements being spaced apart along the first direction 130.

As can be seen in FIG. 3(a), each series of slots 124a-124c is not positioned identically. Rather, the positioning of consecutive series of slots 124a, 124b are offset. Thus, consecutive series of connecting elements 128a, 128b are also offset. In this way, where a connecting element is defined in a first series of slots 124a, laterally co-located in an adjacent series of slots 124b is instead a slot 124, rather than a connecting element 128. That is, and as shown, the series of slots 124a-124c are arranged such that adjacent series of slots are offset from one another, but every other series of slots 124a, 124c is positioned identically in the material. In this way, where a connecting element 128i is defined in a first series of slots, laterally co-located in the adjacent series of slots is instead a slot 124i, or a portion of a slot, but laterally co-located in the subsequent series is again a connecting element 128ii. In this way, connecting elements in every other series are laterally aligned across the width of the material. By this arrangement of slots, regular alternate folding of the material is facilitated. The lateral co-location of connecting elements is indicated by numeral 132 in FIG. 3a. As can also be seen in the Figures, and indicated in FIG. 3b at numeral 136, whilst adjacent series of slots are offset, there are laterally extending regions across the material into which all series of slots comprise slots extending into said region. That is, there are laterally extending regions which comprise a portion of a slot of each of the series of slots provided in the material.

In other words, the slots are provided in a series. The series is generally the same for each adjacent series (e.g. in slot spacing, length, and therefore connecting element spacing and length) but each series is offset relative to one another. This is so that a slot of one series is adjacent to a connecting element associated with an adjacent series. The slots and connecting elements of one series are therefore almost out of phase with the slots and connecting elements of an adjacent series. As shown in the figures, however, there is overlap between slots of adjacent series. In exemplary embodiments, a first and third series are positioned identically, and a second series, between the first and second series, is offset from the first and third series. In one example, where a connecting element is positioned in the first and third series, by virtue of the identical positioning, a slot is instead provided in the second series. This may otherwise be described or summarised as adjacent, or consecutive, series being offset, whilst alternate, or every other, series is aligned, or substantially aligned. The above facilitates folding to form second structures as described herein. For the avoidance of doubt, reference to adjacent series means adjacent in an x direction, which is a lateral direction extending across the material, perpendicular to the first direction 130. The offset is in a y direction, which is a lengthwise direction along the material, perpendicular to the x direction, parallel to the first direction 130. The alignment of series means aligned in the x direction, as described above.

FIGS. 3(a) and 3(b) are not to scale, and relative sizes are exaggerated for the purpose of illustration. It will be apparent to the skilled person, in view of the description which follows, that many variations of slot size, positioning and offset are possible to facilitate the subsequent folding ability of the first structure. No limitation to the above described positioning of slots is intended.

Referring back to FIGS. 1 and 2, the first structure formation apparatus 100 further comprises a former assembly 112 arranged to form the material. In this exemplary embodiment, the former assembly 112 is arranged to form the material subsequent to the cutter assembly 106 providing the slots in the material. In other words, it is likely to be easier and quicker to provide the slots in the material, before forming channels in that material.

At this point, it is worth noting that forming a corrugated or channeled sheet that already has slots in is counterintuitive (as is providing slots in a previously corrugated sheet), because this arguably weakens the corrugated or channeled sheet. However, it is this very combination of slots and forming that is actually extremely subtle and advantageous for the purposes of the invention. Again, the benefits of corrugation-like structure formation and structures, and honeycomb-like structure formation and structures are both realised, yet without the drawbacks.

The former assembly 112 comprises a set of forming rollers. The cut sheet 120 is fed into the former assembly 112. The former assembly 112 is arranged to receive the cut sheet 120 and profile the sheet 120 such that the sheet 120 leaves the former assembly 112 having a profiled form. The former assembly 112 is arranged to introduce the profile in a direction across the sheet 120, substantially transverse (i.e.

perpendicular) to the direction 110 in which the sheet moves through the apparatus 100. The direction in which the sheet 104 moves may be described as the general sheet movement, or flow, direction 110. The profile may be described as undulating, corrugated, or wave-like. In one particularly advantageous embodiment, the profile may be a trapezoid profile. As will become apparent from the description which follows, a trapezoidal profile may facilitate a hexagonal cell structure in a subsequent structure formed by folding the first structure in the manner described herein.

In this way, a cut and formed material is provided. The cut and formed material is referred to as a "first structure" and is indicated at 150.

Figure 4A:
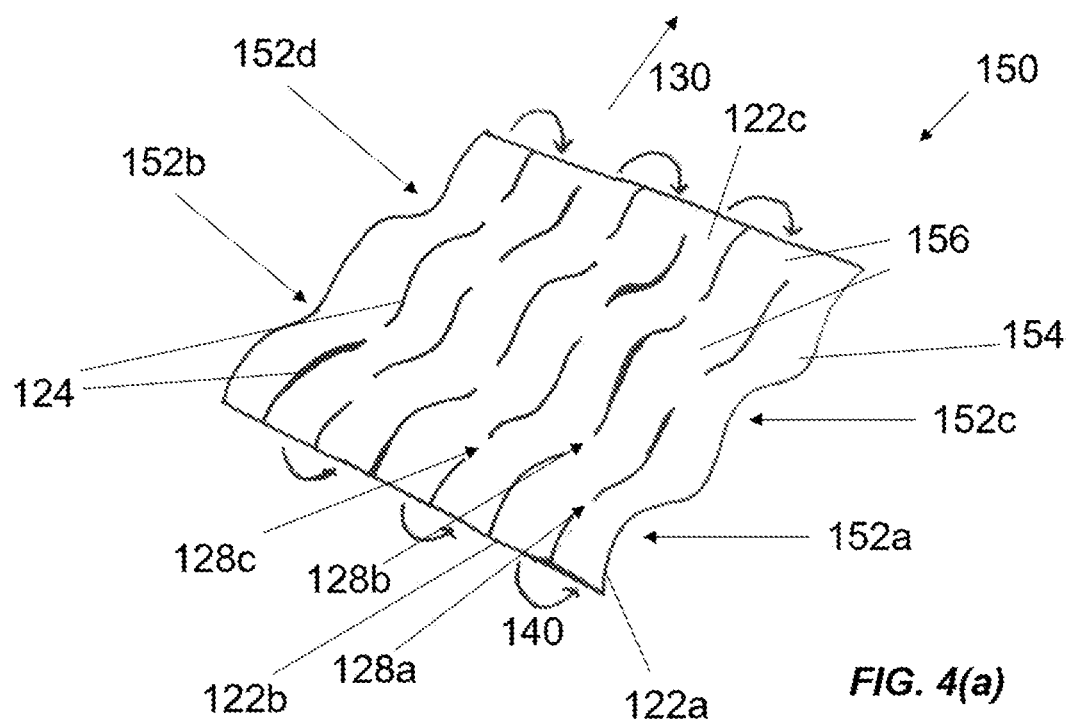
FIG. 4(a) shows a perspective view of a first structure formed from the sheet of FIGS. 3(a) and (b)

Referring to FIGS. 4(a) and (b), the first structure 150 may be described as comprising an array of oppositely oriented channels 152a, 152b, 152c, 152d. The channels 152a-152d may otherwise be described as "corrugations" or "flutes". Each channel extends in a second direction 180 perpendicular to the first direction 130. The array itself extends in the first direction 130. Each channel 152a-152d comprises a base 154 and sides 156 extending from the base 154. The term "base" is intended to refer to the surface connecting the channel sides, irrespective of the orientation of the channel or channels, and could relate to a peak or trough. The base of the channels define the maximum vertical extent of the first structure 150. That is, a first type of channel 152a, 152c has a base which defines an upper extent of the first structure 150. A second type of channel 152b, 152d has a base which defines a lower extent of the first structure 150. A channel of the first type is adjacent a channel of the second type, that is, a downwardly extending channel is adjacent to, or may even be described as forming part of, an upwardly extending channel in that the sides of the adjacent channels lead into one another.

Typically, the bases of all the first type of channel are aligned in a horizontal plane, as is also the case with the second type of channel. An upper and lower (e.g. mathematical or virtual) plane 160, 162 is thereby defined which intersects the bases of the first and second type of channel, respectively. The upper and lower horizontal planes in which the bases of the channels are aligned is a non-continuous, or substantially non-continuous, plane, by virtue of the separation between bases of adjacent channels of the same type.

Figure 4B:
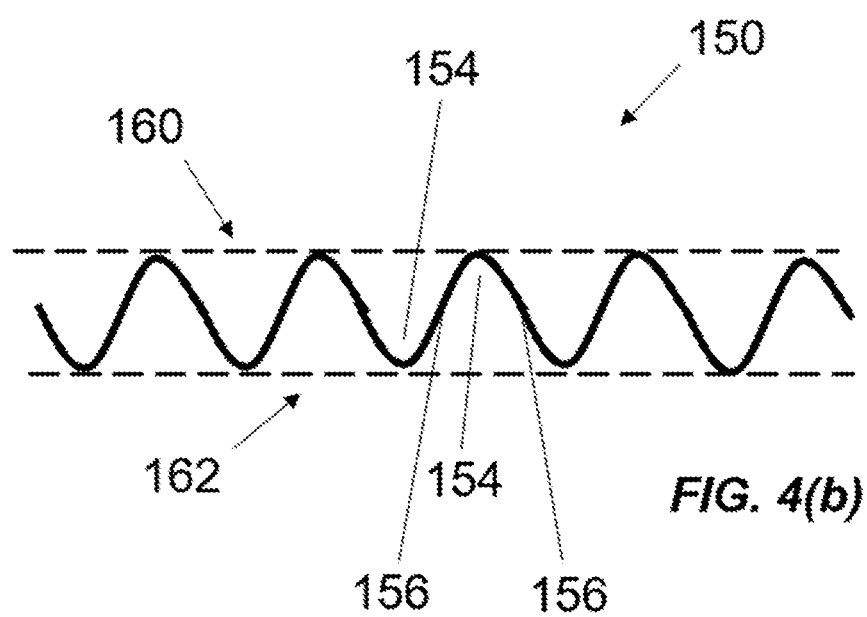
FIG. 4(b) shows a side view of the first structure of FIG. 4(a)

The relative positions of the array of channels 152a-152d and the series of connecting elements 128a, 128b, 128c allows the first structure 150 to be foldable along each of the series of connecting elements 128a-128c about the first direction 130 to bring the first outer plane of a first strip 122a toward the first outer plane of a second, adjacent, strip 122b, as indicated by arrow 140. As will be understood, this folding process is repeatable, to bring the second outer plane of a third strip 122c toward the second outer plane of the second strip 122b. Whilst there are numerous arrangements of relative positions of channels and connecting elements which would ultimately facilitate folding in the manner described, and such arrangements could be readily determined by the person skilled in the art, FIG. 4 shows one particularly advantageous arrangement. In the arrangement shown in the Figure, the connecting elements 128 of a first series of connecting elements intersect a first outer plane 160 of the first structure 150, which may be the upper plane. The connecting elements of a second series of connecting elements, the second series being adjacent the first series, intersect a second outer plane 162 of the first structure 150, which may be the lower plane. Such an alternating configuration of connecting elements intersecting the first or second outer planes is repeated across the width of the first structure 150.

For the avoidance of doubt, the first outer plane can be described as a plane which intersects a first extremal surface of the first structure. In an exemplary embodiment, the first extremal surface of the first structure is the upper surface of the first structure. Similarly, the second outer plane can be described as a plane which intersects a second extremal surface of the first structure. In an exemplary embodiment, the second extremal surface of the first structure is the lower surface of the first structure.

It will be appreciated that this relative positioning of connecting elements and channels is a result of the above described cutting and forming process, wherein the locations of the slots and channels are predetermined to provide the foldable first structure 150.

Whilst in the above exemplary embodiment the cutter assembly 106 precedes the former assembly 112, in another exemplary embodiment of the first structure formation apparatus 100 the former assembly 112 precedes the cutter assembly 106. In this case, the cutter assembly receives pre-formed material. Providing slots in the pre-formed material may be simplified, or otherwise improved, by providing a cutter assembly 106 with a set of lower cutting blades supported on a lower support rail located below the platform and a set of upper cutting blades supported on an upper support rail located above the platform. The sets of lower and upper cutting blades can thus cut the formed material from below or above the material. In this way, the connecting elements and channels can be relatively positioned as described, but the provision of slots in the material is simplified by access to the preformed material from both the lower plane and the upper plane.

In further detail, in the alternative construction where the former assembly 112 precedes the cutter assembly 106, the slots are provided in the material after forming channels, or corrugations, in that material. The process of forming slots in the formed (i.e. profiled or corrugated) material is referred to as "slit-scoring". That is, a formed material having channels or corrugations may be "slit scored" to provide the slots in the material.

To provide slots in the formed material, the upper cutting blades may be positioned to cut through the formed material from above, and the upper cutting blades may be positioned to cut through the formed material from below. As the formed material is moved through the cutter assembly 106, the material is scored therethrough by the upper and lower cutting blades to a depth. The respective cutting blades are not arranged to extend to score completely through the formed material, such that the strips remain connected by virtue of connecting elements at the upper plane 160 (by virtue of the lower cutting blades not extending completely up through the formed material) and at the lower plane 162 (by virtue of the upper cutting blades not extending completely down through the formed material). As will be understood by reference to FIGS. 4(a) and 4(b), connecting elements 128a and 128c at the upper plane 160 of the first structure 150 will remain when the formed material is slit scored in the described manner by the lower cutting blades. Similarly, connecting element 128b at the lower plane 162 of the first structure 150 will remain when the formed material is slit scored in the described manner by the upper cutting blades.

By using the upper and lower cutting blades to "score" the material (i.e. providing a linear cut or slit extending to a depth in the material), multiple individual cuts need not be made in order to provide each of the slots and/or connecting elements in a particular series. That is, a single score through the formed material will form a plurality of slots and connecting elements. This is highly advantageous in increasing machine throughput.

In general, by the above-described alternative construction where the former assembly 112 precedes the cutter assembly 106, it is possible to quickly and efficiently provide a cut and formed first structure 150 having a series of slots 124a-124c and connecting elements 128a-128c from a preformed (e.g. corrugated sheet) material, thereby improving machine throughput.

The first structure 150 leaves the first structure formation apparatus 100 via rollers and/or outflow belts. The rollers and/or outflow belts drive movement of the first structure 150.

Figure 5:
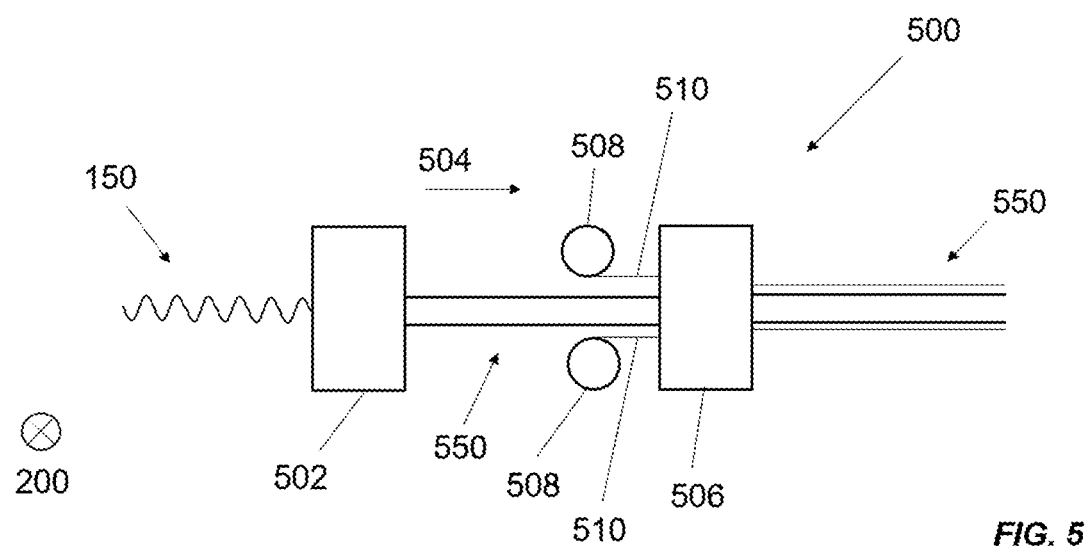
FIG. 5 shows a side view of a second structure formation apparatus.
Figure 6:
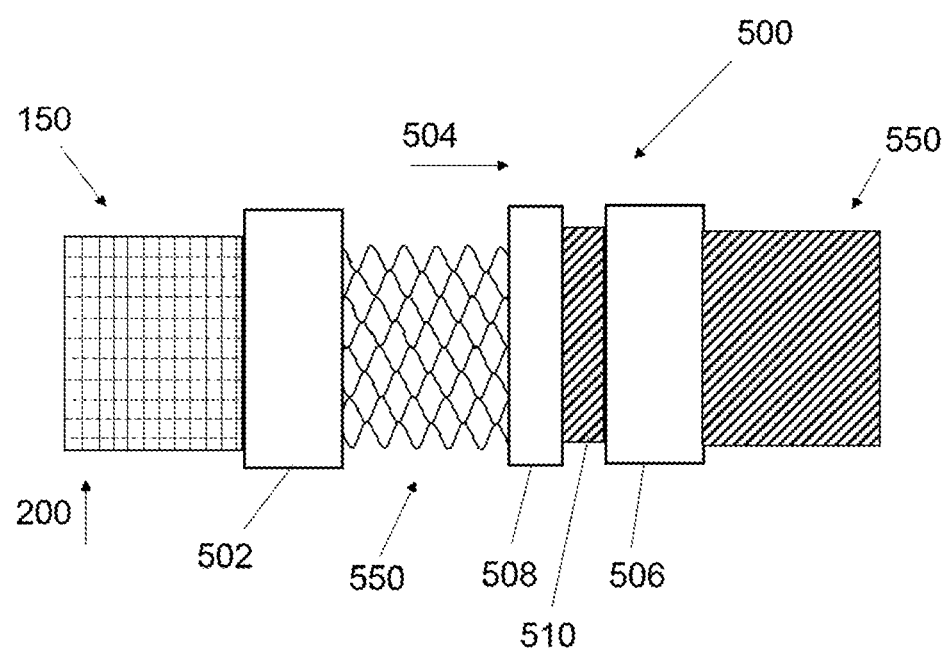
FIG. 6 shows a plan view of the second structure formation apparatus of FIG. 5.

Turning now to FIGS. 5 and 6, a second structure formation apparatus 500 is shown in side and plan view respectively. The second structure formation apparatus 500 is arranged to receive the first structure 150 and form a second structure 550. The second structure formation apparatus 500 comprises a folder assembly 502 arranged to fold the first structure and a retainer applicator assembly 506.

The second structure formation apparatus 500 comprises a plurality of rollers or belts (not shown) to drive movement of the first structure through the apparatus 500 in a first (structure movement, or flow) direction 504. The rollers or belts define a horizontal platform for supporting the first structure and the resultant second structure.

Whilst the second structure formation apparatus 500 is described as being separate and distinct from the first structure formation apparatus 100, it will be appreciated that the second structure formation apparatus 500 may comprise any or all of the features of the first structure formation apparatus 100, as desired or as appropriate.

However, it is conceivable that the first structure formation apparatus 100, and resultant 30 structure 150, could be used and made in a completely different location in a factory, and even in a different geographical location (e.g. different country) to the second structure formation apparatus 500 and structure 550. For instance, one entity A could make the first structure 150 in country B. Second entity C could then take delivery of this first structure 150 in country D, and use this to make second structure 550. That is, the process is a two-stage process, and the stages of manufacture of production do not need to be spatially integrated or undertaking a single, time-continuous, manner.

The second structure formation apparatus 500 is arranged to receive the first structure 150 in a first orientation, in which the channels of the first structure 150 extend in a direction 200 perpendicular to the flow direction 504.

Whilst it will be understood that receiving the first structure in the first orientation facilitates efficient folding of the first structure as it moves through the second structure formation apparatus 500, in another exemplary embodiment, the second structure formation apparatus 500 is arranged to receive the first structure 150 in other orientations. Where this is the case, the arrangement or orientation of the folder assembly 502 and retainer applicator assembly 506 may be modified to facilitate formation of the second structure from the first structure in the other orientation. For example, where the second structure formation apparatus 500 receives the first structure in an orientation in which the channels of the first structure extend in a direction parallel to the flow direction, the folder assembly 502 may be arranged to fold in a direction perpendicular to the flow direction 504.

The folder assembly 502 is arranged to fold the first structure 150 about the first direction 130 along each of the series of connecting elements 128a, 128b, 128c. The folder assembly 502 is arranged to bring the first outer plane of a first strip of the first structure toward the first outer plane of a second, adjacent, strip of the first structure 150.

To do this, the folder assembly 502 is arranged to rotate the strips through 90° about an axis parallel to the first direction 130 (that is, about an axis perpendicular to the direction in which the channels extend, or, about an axis parallel to the direction in which the array itself extends), wherein said axis intersects a series of connecting elements 128a, 128b, 128c, to guide the first outer plane 160 of a third strip 122c toward the first outer plane 160 of a second, adjacent, strip 122b. In an exemplary embodiment, the folder assembly 502 is arranged to bring the first outer plane 160 of a third strip 122c toward and into contact with the first outer plane 160 of the second strip 122b. Of course, and as described above, the folding is repeated across the first structure 150, for example to bring the second outer plane 162 of the second strip 122b toward and into contact with the second outer plane 162 of a first strip 122a, as indicated by arrow 140 in FIG. 4(a).

To produce the rotation of the strips, the folder assembly 502 comprises a manipulator (not shown) comprising a plurality of fingers. The fingers are separated and positioned to contact the strips, or the connecting elements, to apply a force thereto to cause the strips to rotate as described. The fingers are supported on upper and lower support rails, the rails being driven by actuators to bring the fingers into contact with the strips or the connecting elements as the first structure 150 travels through folder assembly 502 of the second structure formation apparatus 500.

This process can be repeated for a plurality of strips connected by virtue of the connecting elements, and by alternately folding adjacent strips to guide the planes toward and into contact with one another, a second structure 550 is formed.

Whilst it is not essential to the invention, application of an adhesive to the bases of the channels of a first strip to adhere them to the bases of the channels of a second strip when they are brought into contact further improves structural rigidity, as will be further discussed herein. In this way, the manner in which the bases of the first and second strips thereby connected are aligned along an axis provides a form of structural support beam to the resulting second structure, which improves performance during flat crush test. Advantageously, it has been found that despite the planes being non-continuous, contact of the bases of the channels cooperatively provides support, which improves the ability of the structure to withstand applied force. Moreover, weight saving benefit is realised by virtue of the lack of continuous layer, for example, a liner layer, and furthermore, the second structure is not material-intensive to manufacture.

The folder assembly 502 further comprises a pair of funneling guides. Whilst not essential to the invention, following rotation or folding of the strips, the funneling guides guide the strips together and firmly into contact with one another. This is particularly advantageous where adhesive is applied to bases, as passing the structure through the funneling guides ensures secure adhesion of strips.

Following the folding, or "rotation", of the strips, the resultant structure may then be described as a second structure 550 formed from a first structure comprising: a plurality of strips 122a-122c of material, a length of each strip extending in a first direction 130, wherein adjacent strips are connected by a series of connecting elements 128a-128c, the connecting elements being spaced apart along the first direction 130, the material being formed to provide: an array of oppositely oriented channels 152, each channel extending in a second direction 180 perpendicular to the first direction 130, and the array itself extending in the first direction 130, each channel 152 comprising a base 154, and sides 156 extending from the base 154; and a first, non-continuous, outer plane 160; and a second, non-continuous, outer plane 162, the first structure being folded along each of the series of connecting elements 128a-128c about the first direction 130 to bring the first outer plane 160 of a first strip 122a toward, and optionally into contact with, the first outer plane 160 of a second, adjacent strip 122b, thereby to provide the second structure 550. The second structure formation apparatus 500 may further comprise a manipulator assembly (not shown). The manipulator assembly may be comprised in the folder assembly 502, optionally as part of the funneling guides, but the manipulator assembly may also be incorporated in the apparatus 500 elsewhere preceding the retainer applicator assembly 506.

Figure 7A:
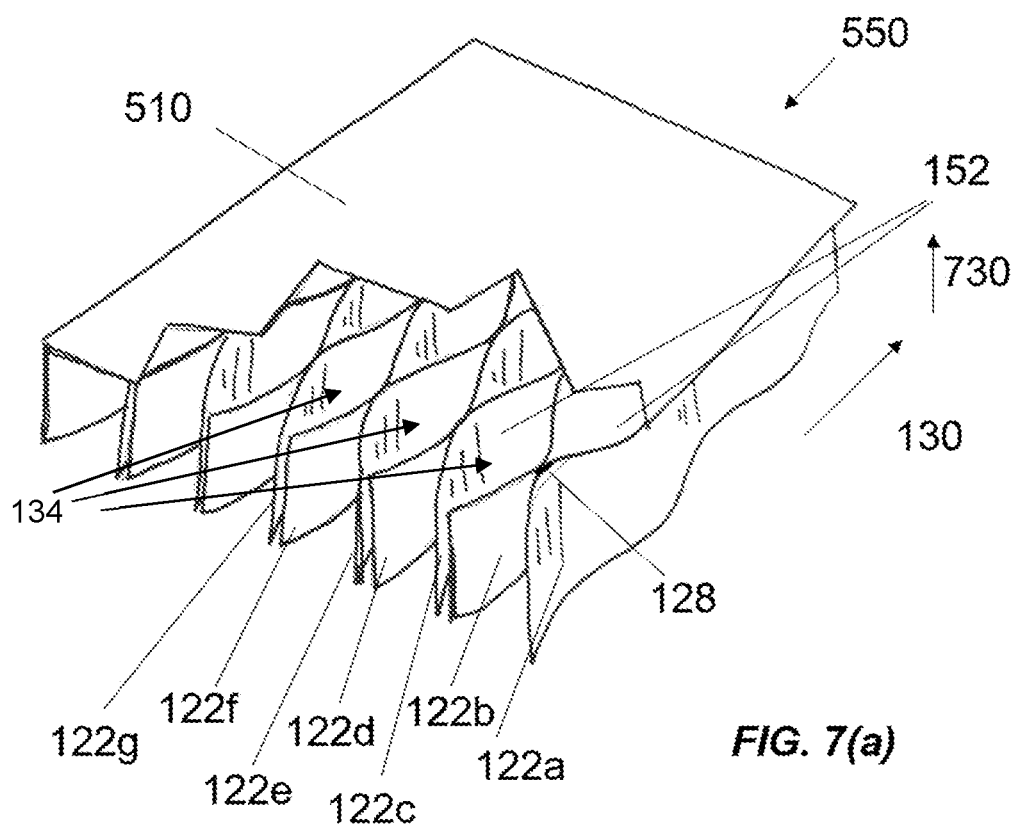
FIGS. 7(a) and (b) show perspective views of a second structure.
Figure 7B:
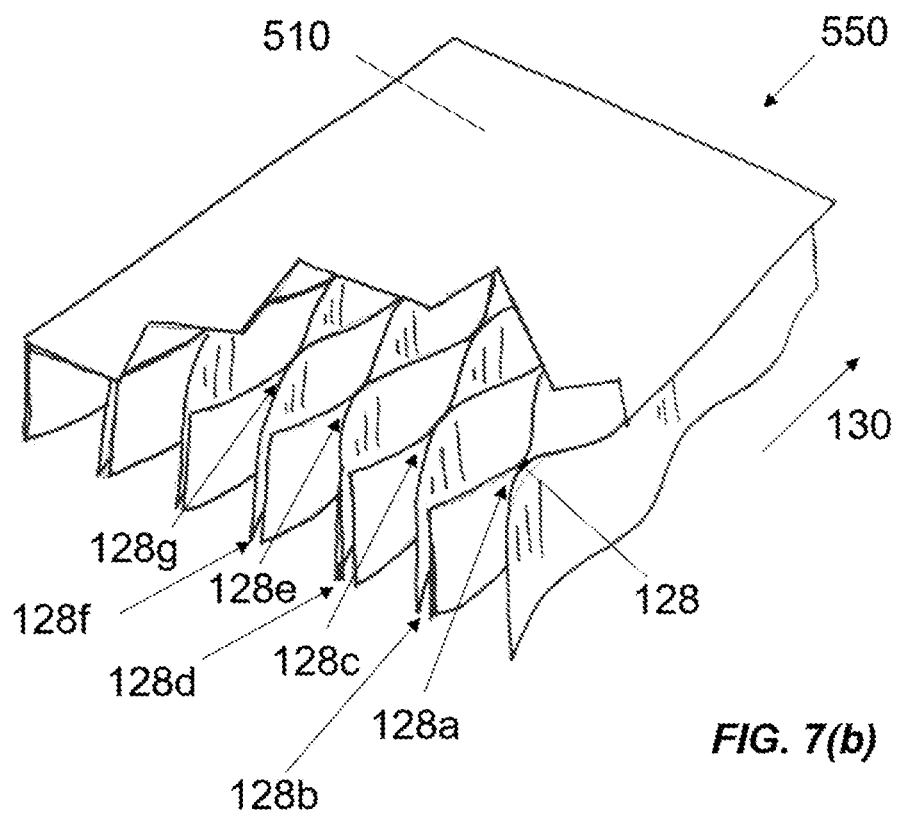

The manipulator assembly is arranged to manipulate the second structure 550 to adjust or control the size of the "cells" defined by the oppositely oriented channels of adjacent strips. That is, it will be appreciated from the description above and the figures (see, for example, FIG. 7(a) showing cells 134) that bringing the first outer plane 160 of a first strip 122a toward and into contact with the first outer plane 60 of a second, adjacent strip 122b defines one or more cells 134 defined by the oppositely oriented channels of said strips. In general, this process may be known as "manipulation of the cell structure". This process may also be known as "linear manipulation of the cell structure" where the manipulation takes place from the foremost and/or rearmost ends (relative to the first direction 130) of the second structure 550.

The manipulator assembly is controllable to force the second structure 550 inwardly (e.g. by funneling) thereby to cause the cells 134 to become narrower and elongated. The manipulator assembly may comprise funneling guides for this purpose. Additionally, the manipulator assembly is controllable to stretch the second structure 550 outwardly (e.g. by gripping and pulling the sides of the second structure 550) to cause the cells 134 to become wider and shorter. The manipulator assembly may comprise gripping members for this purpose. It will be understood that this may also be achieved by taking a second structure 550 and compressing and/or pulling it at its foremost and rearmost ends (relative to the first direction 130). Compressing members and/or gripping members may be employed for this purpose. In this way, the length and/or width of the total second structure 550 may be controlled, by virtue of controlling the cell size. Subsequent to this manipulation process, a retainer may be applied as described herein to retain the cell size and thus desired length and/or width of the second structure 550.

The retainer applicator assembly 506 receives the second structure 550 and is arranged to apply a retainer thereto. The retainer applicator assembly 506 may form part of the folder assembly 502, in that the retainer applicator assembly 506 is arranged to apply an adhesive to the channel bases before the before the strips are folded or guided through the funneling guides to form the second structure. Nevertheless, in the exemplary embodiment illustrated in FIGS. 5 and 6, the retainer applicator assembly 506 is arranged to receive the second structure from the folder assembly 502 and apply a retainer to the second structure 550.

The retainer applicator assembly 506 comprises a cover arrangement configured to receive additional sheet 510 from additional sheet feeders 508. The retainer applicator assembly 506 receives the second structure 550 from the folder assembly 502 and at least partially covers the second structure with the additional sheet 510. The sheet feeding and covering may be undertaken continuously, as the second structure travels through the retainer applicator assembly 506. In this exemplary embodiment, the retainer applicator assembly 506 comprises an upper retainer applicator and a lower retainer applicator, each of which might conveniently take the form of a roller that can apply the retainer to the second structure 550. Each of the upper retainer applicator and lower retainer applicator comprises a splicer for automatically splicing one roll of additional sheet onto another roll thereby to maintain a continuous feed. The cover arrangement may attach the cover sheet 510 to the second structure 550 by way of adhesive, which may already be applied to the cover sheet. The cover arrangement may be heated to activate the adhesive. The cover arrangement might provide adhesive on one or both of the cover sheet and/or the second structure. In this manner, the application of a cover sheet might be considered as a form of lamination.

The retainer applicator assembly 506 further comprises a drying and cooling arrangement arranged to supply a flow of hot and cold air to dry the adhesive and subsequently cool the structure.

FIGS. 7(a) and (b) show two identical exemplary resultant second structures 550 manufactured by second structure formation apparatus 500. In the examples shown, a cover sheet 510 has been applied to the second structure 550, and a section of the cover sheet 510 has been cut away to reveal the strips 122a-122g and connecting elements 128 beneath. In the Figures, only connecting elements 128 which are at the upper plane of the second structure 550 can be seen, as the lower connecting elements are obscured by the second structure 550. The second structure 550 comprises the first structure 150, that is, a plurality of strips of material 122a-122g, a length of each strip extending in a first direction 130, wherein adjacent strips are connected by a series of connecting elements 128a-128g, the connecting elements 128 being spaced apart along the first direction 130, the material being formed to provide: an array of oppositely oriented channels 152, each channel 152 extending in a second direction 730 perpendicular to the first direction 130, and the array itself extending in the first direction 130, each channel 152 comprising a base 154, and sides 156 extending from the base 154; and a first, non-continuous, outer plane 160; and a second, non-continuous, outer plane 162, wherein the first structure 150 is folded along each of the series of connecting elements 128a-128g about the first direction 130 to bring the first outer plane of a first strip toward, and optionally into contact with, the first outer plane of a second, adjacent strip, thereby to provide the second structure 550. The first outer plane 160 and second outer planes 162 are described as "outer planes", as they are outermost planes of each strip 122a-122g. However, it will be understood that they are internal to the second structure 550 when formed.

As can also be seen from FIGS. 7(a) and (b), the first plane of a first strip is contiguous with the first plane of an adjacent strip. That is, the strips lie next to one another such that they are touching. By rotating the strips to position them contiguously, additional beam strength is provided as the bases of the channels of a first strip cooperatively support the bases of the channels of a second strip. As can also be seen from the figures, the strips all have approximately the same dimension (e.g. length, width and height), and corresponding bases of channels of adjacent strips are positioned in contact with one another. This ensures that each strip, when contiguous to adjacent strips, is fully supported by the adjacent strips.

As will be appreciated from the above, the widths of the strips of the first structure (defined by the separation between series of slots) used to form the second structure determine, or influence, the height of the resultant second structure due to the rotation, or folding, of the strips in the manner described. Certain dimensions of the first structure, including strips width relative to the total first structure width, are particularly advantageous. For example, where the total width of the first structure is substantially equal to the total width of the folded, second structure, significant improvements in second structure formation apparatus 500 throughput are realised. This is because no adjustment to the tooling need be made during the process to accommodate a substantial change in the width, or dimension, of the structure.

To exemplify this, if a 3000 mm wide, 15 mm high first structure, having strips of 15 mm wide is provided to the second structure formation apparatus 500, the resultant second structure will have substantially the same width as the first structure. Thus, the travel path through the second structure formation apparatus 500 need only be as wide as the output from the first structure formation apparatus, which has advantages in increasing throughput speed. However, if strips narrower than 15 mm are defined by the slots cut therein, the resultant second structure will be wider than the first structure provided to the second structure formation apparatus 500. Conversely, if strips wider than 15 mm are defined by the slots cut therein, the resultant second structure will be narrower than the first structure provided to the second structure formation apparatus 500.

Nevertheless, it is appreciated that it is often required to manufacture second structures 550 having heights which result in the width of the second structure being considerably smaller than the width of the first structure, by virtue of folding a first structure having a large strip width (or separation between series of slots). Whilst it may be required for these second structures to have such heights, it may be necessary or desired for the second structure to retain its original width. Where this is the case, a rotator assembly may be provided between the folder assembly 502 and the retainer applicator assembly 506.

Figure 8:
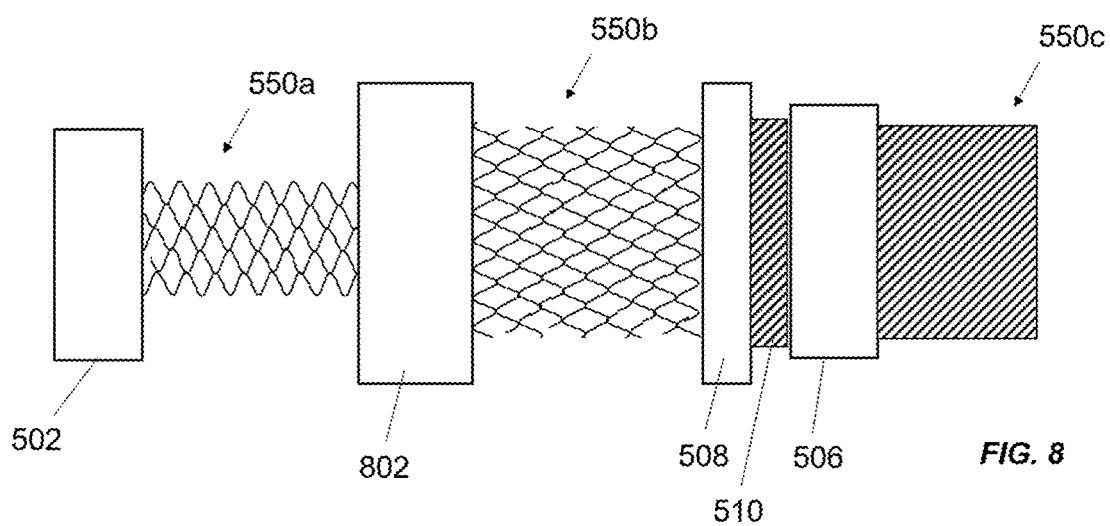
FIG. 8 shows a second structure formation apparatus comprising a rotator assembly.

Referring to FIG. 8, such a rotator assembly 802 is arranged to receive the folded second structure 550a from the folder assembly 502. In this exemplary embodiment, the rotator assembly 802 receives a continuous feed of folded second structure 550a from the folder assembly 502. As a result, the rotator assembly 802 comprises cutting blades operable to cut lengths of the second structure 550a. As will be apparent from the description which follows, the lengths of the second structure cut in this manner define the width of the resultant structure which is output from the rotator assembly 802.

Once a length of the second structure is cut from the infeed, the rotator assembly rotates the piece by 90° about a vertical axis. In this way, the length of the second structure piece 550b is now the width of structure. This process of cutting and rotating may be repeated, and the pieces of second structure 550b can be output continuously, with little or no gap between consecutive pieces. Optionally, adhesive may be applied to the foremost and rearmost faces of the second structure pieces and consecutive pieces can be brought into contact such that a one-piece board is formed. It will be appreciated that application of adhesive is not essential, and instead other methods of ensuring that there is little or no gap between the consecutive pieces are possible, for example by the use of stepper conveyors or the like.

The rotated second structure 550b is then fed to the retainer applicator assembly 506, where a retainer, such as a cover sheet 510, is applied as described above. The application of the cover sheet may negate any need to apply adhesive to the foremost and rearmost faces of the structure pieces, as the cover sheet holds the pieces together to form a board of second structure.

In this way, a second structure 550c is formable that has a substantial width, despite having a height which initially substantially reduced the width of the second structure. This problem is solved by the cutting and rotating steps described.

In an alternative exemplary embodiment, multiple first structure feeders may be used to solve the problem of the width of the second structure 550 being less than desired following folding. Multiple first structures from multiple first structure feeders can be joined together to form a first structure of larger width. To that extent, the second structure formation apparatus 500 may comprise a joiner assembly, arranged to receive multiple first structure 150 inputs and to join those first structures 150 together in a side-by-side manner to form a larger (e.g. wider) first structure. Of course, care must be taken to ensure that the arrangement of connecting elements necessary for folding, as described above, is maintained.

Second structure heights determined to exhibit significantly improved strength have a height of between 10 mm-50 mm. Moreover, where the width of the strips are between 10 mm-20 mm, and particularly between 10 mm-12 mm, throughput speeds of the second structure formation apparatus 500 are considerably increased as these facilitate the "linear" operating arrangement and reduce the need to rotate the second structure. Nevertheless, second structures having larger heights may also be advantageous in that they are easier to crush, which provides for damping under impact. For example, second structure heights of 15 mm, 20 mm and 25 mm would be particularly useful in the industry.

In summary, first structures, second structures and apparatus for, and methods of, forming such first structures and second structures have been described. As will be appreciated from the above, the dimensions of such first and second structures are not limited, and numerous variations are possible. Techniques for manufacturing first and second structures of large heights and widths are taught herein and will be understood by the skilled person.

For the avoidance of any doubt, a strip means a long, narrow piece of material. In specific embodiments, a strip might mean a long, narrow piece of material having a width of up to 5 mm, 10 mm, 15 mm, 20 mm, 50 mm or 100 mm.

Figure 9:
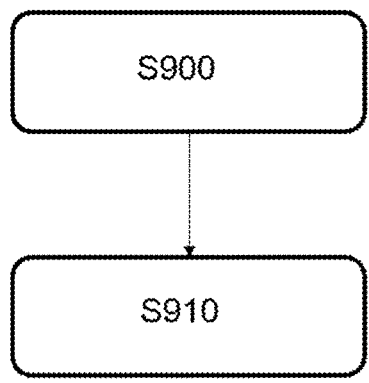
FIG. 9 shows general methodology principles of forming a first structure.

In FIG. 9, general methodology principles of forming a first structure are shown. Step S900 comprises providing one or more slots in a material, thereby to define a plurality of strips of the material, the slots defining a series of connecting elements connecting adjacent strips of the material, the connecting elements being spaced apart along a first direction. Step S910 comprises forming the material to provide: an array of oppositely oriented channels, each channel extending in a second direction perpendicular to the first direction, and the array itself extending in the first direction, each channel comprising a base, and sides extending from the base; and a first, non-continuous, outer plane; and a second, non-continuous, outer plane. In this way, the first structure is foldable along each of the series of connecting elements about the first direction to bring the first outer plane of a first strip toward, and optionally into contact with, the first outer plane of a second, adjacent strip.

Figure 10:
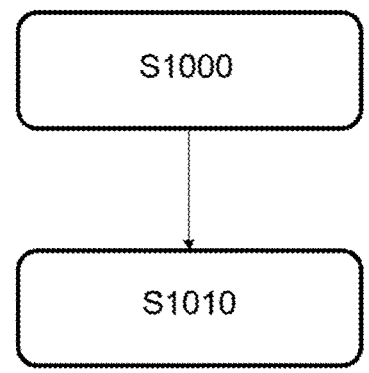
FIG. 10 shows general methodology principles of forming a second structure.

In FIG. 10, general methodology principles of forming a second structure from a first structure are shown. Step S1000 comprises providing a first structure comprising: a plurality of strips of material, a length of each strip extending in a first direction, wherein adjacent strips are connected by a series of connecting elements, the connecting elements being spaced apart along the first direction, the material being formed to provide: an array of oppositely oriented channels, each channel extending in a second direction perpendicular to the first direction, and the array itself extending in the first direction, each channel comprising a base, and sides extending from the base; and a first, non-continuous, outer plane; and a second, non-continuous, outer plane. Step 1010 comprises folding the first structure along each of the series of connecting elements about the first direction to bring the first outer plane of a first strip toward, and optionally into contact with, the first outer plane of a second strip, the second strip adjacent the first strip.

Although a few preferred embodiments of the present invention have been shown and described, it will be appreciated by those skilled in the art that various changes and modifications might be made without departing from the scope of the invention, as defined in the appended claims.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of forming a second structure, comprising:
    forming a first structure by:
        providing one or more slots in a material, thereby to define a plurality of strips of the material, the slots defining a series of connecting elements connecting adjacent strips of the material, the connecting elements being spaced apart along a first direction, by moving the material in a material movement direction through a cutter assembly and cutting the material in a direction parallel to the material movement direction to provide the one or more slots; and
        forming the material to provide:
            an array of oppositely oriented channels, each channel extending in a second direction perpendicular to the first direction, and the array itself extending in the first direction, each channel comprising a base, and sides extending from the base; and
            a first, non-continuous, outer plane; and a second, non-continuous, outer plane,
        such that the first structure is foldable along each of the series of connecting elements about the first direction to bring the first outer plane of a first strip toward the first outer plane of a second, adjacent strip;
    forming the second structure from the first structure by folding, using a folder assembly, the first structure along each of the series of connecting elements about the first direction to bring the first outer plane of a first strip toward the first outer plane of a second strip, wherein:
the second strip is adjacent the first strip, and
the first direction is parallel to a material flow direction of the first structure through the folder assembly during the forming the second structure.

2. A method as claimed in claim 1 wherein the material is formed to provide each series of connecting elements intersecting one of the first outer plane and second outer plane.

3. A method as claimed in claim 1 wherein the providing the one or more slots in the material precedes the forming the material.

4. A method as claimed in claim 1, further comprising:
    folding the first structure to bring the second outer plane of the second strip toward the second outer plane of a third strip, the third strip adjacent the second strip.

5. A method as claimed in claim 1 further comprising:
    cutting a piece of the second structure, the piece of second structure having a length;
    rotating the piece of the second structure about a vertical axis, such that the length is now a width of the second structure;
    repeating the cutting and rotating for further pieces of second structure.

6. The method of claim 1, further comprising applying a retainer layer to fix the first strip and second strip in position relative to one another, wherein the retainer layer is a cover sheet spanning channels between the first and second strips.

7. A structure formation apparatus comprising:
    a cutter assembly arranged to provide one or more slots in a material, thereby to define a plurality of strips of the material, the slots defining a series of connecting elements connecting adjacent strips of the material, the connecting elements being spaced apart along a first direction, wherein the material is moved in a material movement direction through the cutter assembly and the cutter assembly is arranged to cut the material in a direction parallel to the material movement direction to provide the one or more slots;
    a former assembly arranged to form the material to provide:

an array of oppositely oriented channels, each channel extending in a second direction perpendicular to the first direction, and the array itself extending in the first direction, each channel comprising a base, and sides extending from the base; and a first, non-continuous, outer plane; and a second, non-continuous, outer plane, such that the first structure is foldable along each of the series of connecting elements about the first direction to bring the first outer plane of a first strip toward the first outer plane of a second, adjacent strip; and, a folder assembly arranged to fold the first structure about the first direction along each of the series of connecting elements, wherein the folder assembly is arranged to bring the first outer plane of the first strip toward the first outer plane of the second, adjacent, strip, wherein the first direction is parallel to a material flow direction of the first structure through the folder assembly.

8. A structure formation apparatus as claimed in claim 7 wherein the former assembly is arranged to form the material to provide each series of connecting elements intersecting one of the first outer plane and second outer plane.

9. A structure formation apparatus as claimed in claim 7, wherein the former assembly is a corrugator assembly arranged to corrugate the material.

10. A structure formation apparatus as claimed in claim 7, wherein the cutter assembly is arranged to provide the one or more slots in the material prior to the former assembly forming the material.

11. A structure formation apparatus as claimed in claim 7, wherein the former assembly is arranged to form the material to provide: a first series of connecting elements intersecting the first outer plane, the first series of connecting elements connecting a first strip and a second strip, and a second series of connecting elements intersecting the second outer plane, the second series of connecting elements connecting the second strip and a third strip.

12. A structure formation apparatus as claimed in claim 7 further comprising a retainer applicator assembly, arranged to apply a retainer to the second structure to fix the first strip and second strip in position relative to one another.

13. A structure formation apparatus as claimed in claim 7 further comprising:

a rotator assembly arranged to:
cut a plurality of pieces of the second structure, each piece of the second structure having a length; and
rotate the plurality of pieces of the second structure about a vertical axis, such that the length is now a width of the second structure.

14. A structure formation apparatus as claimed in claim 12 further comprising:

a rotator assembly arranged to:
cut a plurality of pieces of the second structure, each piece of the second structure having a length; and
rotate the plurality of pieces of the second structure about a vertical axis, such that the length is now a width of the second structure, and,
the retainer applicator assembly being arranged to apply the retainer to the rotated pieces of the second structure to hold the pieces together.

\* \* \* \* \*